United States Patent [19]

Morris

[11] Patent Number: 4,898,305

[45] Date of Patent: Feb. 6, 1990

[54] CONDIMENT CONTAINER AND DISPENSER

[75] Inventor: William Morris, 383 Ellsworth Ave., New Haven, Conn. 06511

[73] Assignee: William Morris, New Haven, Conn.

[21] Appl. No.: 222,023

[22] Filed: Jul. 21, 1988

[51] Int. Cl.⁴ .............................................. A47G 19/12
[52] U.S. Cl. ........................... 222/142.5; 222/196.1; 141/349
[58] Field of Search ............... 222/142.3, 142.5, 196, 222/196.1, 196.2, 196.5, 478, 480, 482, 515, 518, ; 141/2, 21, 102, 104, 291–293, 312, 346, 349, 364, 378

[56] References Cited

U.S. PATENT DOCUMENTS

| | | | |
|---|---|---|---|
| 969,566 | 9/1910 | Rigby | 222/142.5 |
| 1,628,106 | 5/1927 | Booty | 222/501 |
| 1,816,141 | 7/1931 | Booty | 222/501 |
| 2,203,880 | 6/1940 | Schindelbeck | 222/142.5 X |
| 2,696,337 | 12/1954 | Dinhofer | 141/349 |
| 2,779,518 | 1/1957 | Morris | 222/518 X |
| 2,989,091 | 6/1961 | Lowenthal | 141/349 X |
| 3,343,718 | 9/1967 | Siegel et al. | 141/21 X |
| 3,435,994 | 4/1969 | Freed et al. | 222/196 |
| 4,448,334 | 5/1984 | Morris | 222/230 |
| 4,598,844 | 7/1986 | Morris | 222/196.2 |

Primary Examiner—Michael S. Huppert
Attorney, Agent, or Firm—Robert H. Montgomery

[57] ABSTRACT

A condiment container and dispenser comprising a container having a member therein defining a central chamber and a second chamber about the central chamber, the container has open ends with each chamber communicating with one of the open ends, a closure member closes each of the open ends and has openings therethrough, a spring member of conical shape defined by closely spaced helices of decreasing diameter normally closes each of the openings in the closure members and a plunger member is carried by each of the springs and extends from the closure members, the plunger members are effective to extend an associated spring and permit material to be dispensed from either end of the container and dispenser. A condiment container and dispenser embodying the invention is also useful when filling a smaller condiment dispenser which has a conical spring orifice.

18 Claims, 3 Drawing Sheets

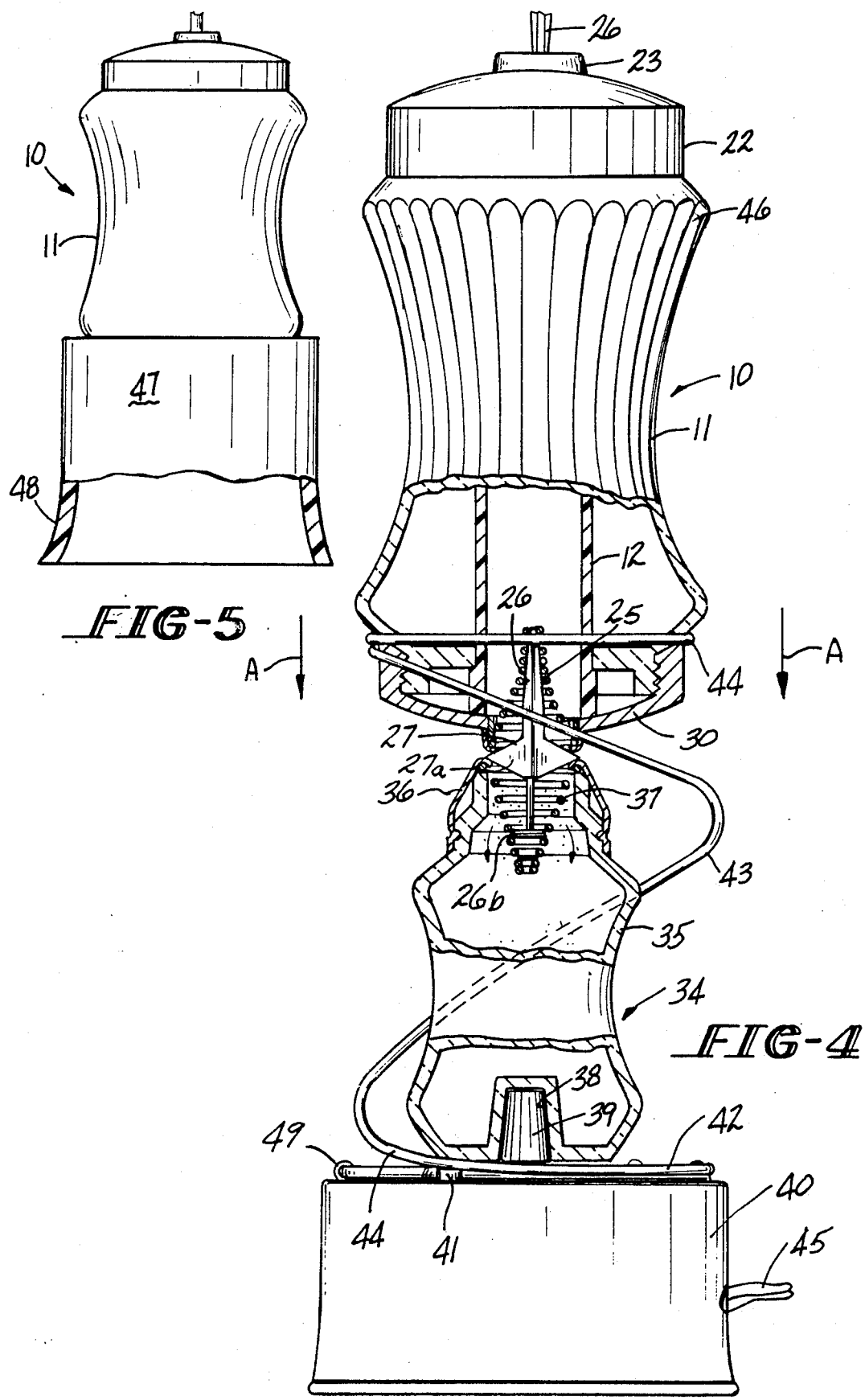

CONDIMENT CONTAINER AND DISPENSER

FIELD OF THE INVENTION

This invention relates to containers and dispensers for material in granular or powdered form and more particularly relates to a salt and pepper dispenser that is a container and is useful for filling smaller condiment dispensers as shown in U.S. Pat. Nos. 4,448,334 and 4,598,844.

BACKGROUND OF THE INVENTION

All cooks use salt and pepper which is dispensed from generally small refillable containers having a top or bottom which is removable for refilling the container, and alternatively in some cases, the salt and pepper may be dispensed from the container in which it was purchased. In either case, the person preparing food and using the salt and pepper has the unpleasant task of removing a top or bottom for refilling the container, and in the case of the original container the condiment comes in, has the chore of removing the condiment container from a cupboard or cabinet and then replacing it.

Accordingly, the present invention provides a new and improved condiment container and dispenser and holder that holds half or more of the condiment sold in store bought containers that have salt at one end and pepper at the other, that lays on its side without rolling in transit about the kitchen, that also provides a new and improved means for filling smaller condiment dispensers as shown in U.S. Pat. Nos. 4,448,334 and 4,598,844 which have a flexible cone spring orifice that is expanded by a plunger to allow transfer of the condiment by pouring. For optimum transfer of the condiments, a vibrating platform is provided.

SUMMARY OF THE INVENTION

Briefly stated the invention in one form thereof comprises concentric containers where a first large container has openings at both ends thereof and at one end of the first container a second container is concentrically received therein and defines an opening to the interior of the second container opposite the opening into the first container. The container preferrably has concave sides to facilitate gripping and a surface to inhibit rolling. A closure member is received at either end of the outer container. The closure members have disposed centrally therein an orifice or an opening which is closed by a conical spring with closely wound helicies. A plunger having stops to engage the orifice lip extends into the spring and is adapted to expand the spring a predetermined amount to permit shaking or pouring of the material in either container or to facilitate filling a condiment dispenser using the finger depresser and a plunger stop to engage the orifice lip, as exemplified in U.S. Pat. Nos. 4,448,334 and 4,598,884.

The outer container is preferably formed with flats or other portions along the edges thereof to prevent the outer container from rolling along a counter top or other surface. Alternatively, a stand may be provided to hold the dispenser upright. Still further, the device may be used in conjunction with a vibrator that imparts vertical motion to facilitate filling of the dispensers as exemplified in the aforementioned patents. The invention further provides a new and improved arrangement for attaching a helical spring orifice condiment dispenser between a cap and a container so that it provides a maximum exposure of the largest coils with a minimum of surface for the granules to cling.

An object of this invention is to provide a new and improved condiment dispenser.

Another object of this invention is to provide a condiment dispenser which will hold two condiments such as salt and pepper and is easily handled and stored.

A further object of this invention is to provide a new and improved method to assemble the condiment orifice without adhesives using a press fit as a means to secure the orifice parts from easily coming apart.

Still another object of this invention is to provide a new and improved condiment dispenser for use in filling smaller condiment dispensers as disclosed in U.S. Pat. No. 4,448,334 and 4,598,844.

The features of the invention which are believed to be novel are particularly pointed out and distinctly claimed in the concluding portion of this specification. However, the invention together with further objects and advantages thereof may be best appreciated by reference to the following specification taken in conjunction with the drawings.

BRIEF DESCRIPTION OF THE DRAWINGS

FIG. 4 is an elevation partially cut away showing the manner in which the device embodying the present invention is utilized to fill a smaller condiment dispenser;

FIG. 5 is an elevation showing a stand which may be used for a device embodying the invention.

DETAILED DESCRIPTION OF THE PREFERRED EMBODIMENT OF THE INVENTION

Figure 1:
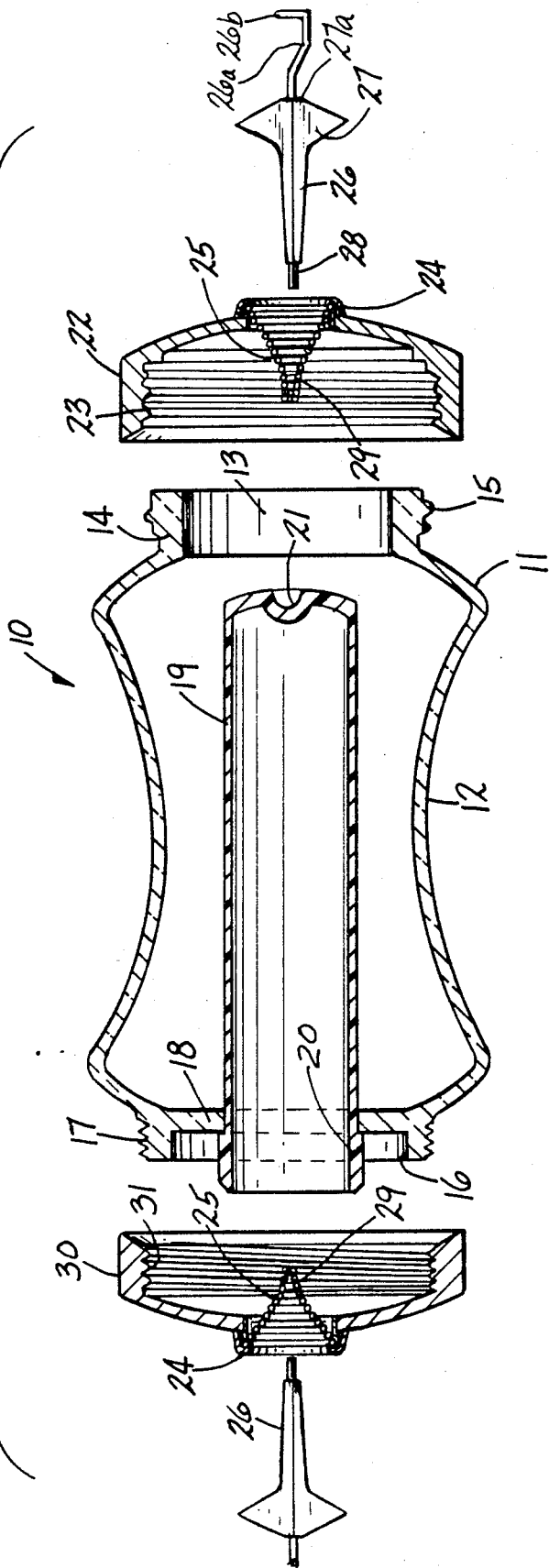
FIG. 1 is an exploded view in section of a dispenser embodying the invention.

Apparatus embodying the invention is best seen by the exploded sectional view of FIG. 1. A container and dispenser 10 comprises an outer housing member 11 having a generally concave sidewall 12 to enhance gripping. An opening 13 is defined at one end thereof through a collar 14 having outer threads 15 thereon. The other end of container 11 also has a collar 16 with outer threads 17 thereon and has an inwardly directed flange 18 defining a central opening that receives a second container 19. Container 19 is generally of cylindrical shape but may be slightly tapered to provide a press fit where it enters the opening in flange 18. Container 19 further has a portion 20 of larger diameter than the opening in flange 18 to provide proper seating and may have a recess 21 at the closed end thereof for purposes hereinafter described. A closure member 22 has internal threads 23 adapted to threadable mate with the threads 15 on collar 14. Closure member 22 has a central opening therein which receives a retainer or adapter member 32 which in turn receives a conical helical spring 25 as hereinafter more fully described. Helical spring 25 is captured between adapter 32 and cap member 24 as hereinafter described.

Figure 2:
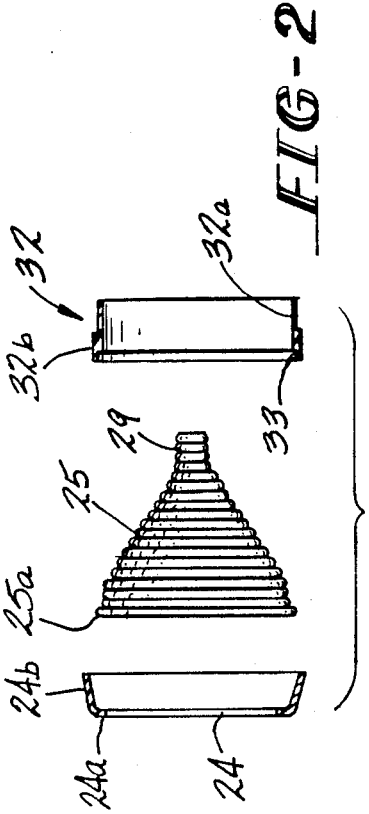
FIG. 2 is an exploded view of a portion of FIG. 1.

A plunger member 26 having ribs or vanes 27 is received in spring 25. Plunger member 26 has a portion 28 of smaller diameter which is received in lower cylindrical coils 29 of spring 25 as seen in FIG. 2. Portion 28 of plunger 26 is compressively engaged by the helical coils 29 and retained therein. Plunger 26 further has extending therefrom and outwardly of container 10 a depressing portion 26a terminating in an open loop 26b for reasons hereinafter described. The ribs or vanes 27 are dimensioned to extend radially a distance such that they will engage member 24 and limit the extension of spring 25 when plunger 26 is depressed.

At the other end of container 11 there is a further closure cap 30 having internal threads 31 adapted to threadably engage the threads 17 on collar 15. The construction of cap 30 is substantially the same as closure member 22 and it contains the same spring-plunger relationship and therefore bears the same reference numerals.

It will be apparent that when the spring 25 in cap 22 is extended, communication will be provided with the interior of member 11. In practice, container 19 may be filled with pepper while the interior of member 11 about member 19 is filled with salt. Thus a user may grasp the concave sidewall and turn the container 11 in either direction to either dispense salt or to dispense pepper for cooking. In either case, the user would depress one of the plungers 26 and shake or pour the selected condiment from either the interior of container 11 or member 19. The recess 21 in container 19 is to provide clearance for plunger portion 28 if necessary.

Reference is now made to FIG. 2 which is an exploded view of a portion of FIG. 1. FIG. 2 exemplifies the components of an orifice defining means which comprises a cap member 24, a closely wound conical spring 25 and a press fit adapter 32. Adapter 32 has a thin side wall 32a which is fitted into the opening in a closure member 22 or 30, and further defines a shoulder 33 which receives and supports a top helix 25a of spring 25. Cap member 24 has a retaining lip 24a and a slightly outwardly tapered side wall 24b of five degrees, more or less. Lip 24a has a dimension which may be substantially the same as the diameter of the coils of spring 25. For example only, retaining lip may be 0.033 to 0.040 inch, while the spring coils have a diameter of about 0.033 inch. This dimensional relationship minimizes the cling surface to which condiment granules might adhere and maximizes the exposure of the large upper coils which are more expandable than the smaller diameter coils. Cap member 24 is press fitted over the larger diameter portion 32b of adapter member 32 to capture helix 25a between lip 24a and shoulder 33. The larger diameter side wall above shoulder 33 is very thin and may flex when cap 24 is pressed thereon. The wall 32a of adapter member 32 is very thin and may have a slight taper to facilitate a friction or press fit within the opening in a closure member 22 or 30. The opening defined in cap member 24 is less than the dimension across opposed ribs 27 on plunger 26 to limit the extent to which a spring 25 can be extended.

Figure 3:
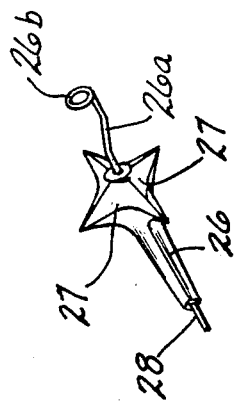
FIG. 3 is a perspective view of a plunger used in the invention.

FIG. 3 shows a plunger 26 in perspective to better disclose the ribs or vanes 27.

Reference is now made to FIG. 4 which shows a container 10 embodying the invention utilized to fill a small condiment container of the type as shown in U.S. Pat. Nos. 4,448,334 and 4,599,854. Such a container 34 comprises a hollow body member 35 with a cap member 36 retaining a conical spring 37 which defines a dispensing orifice. Here spring 37 is captured between body member 35 and cap member 36.

A device embodying the invention may be utilized to fill such a condiment container 34 by inserting with downward pressure member 26a which will depress and extend spring 37 to provide a greater area between the helices of spring 37. At the same time there will be a reaction on plunger 26 and it will extend the spring 25 to permit the condiment to fall by gravity from container 19 as shown (or from container 11 if the device is inverted).

Member 26a terminates in a loop 26b which bears on the lower helices of spring 37 and which will not interfere with passages of grains of the condiment along the axis of spring 37. The loop will engage a small helix of spring 37 but will freely pass through the next larger helix.

In this manner, the small condiment container 34 may be filled from a device embodying the invention. FIG. 4 further exemplifies another feature of the invention where the condiment dispenser 34 has a socket 38 defined in the bottom thereof which receives a shaft 39 therein from a vertical vibrator 40 having an OFF/ON switch 41. Secured to vibrator 40 is a lower loop 42 of a resilient spring like member 43 having an upper loop 44 adapted to receive dispenser 10. When dispenser 10 is urged downwardly as shown by the arrows A plunger 26 will extend spring 37 and also the reaction will extend spring 25. Resilient member 43 will be compressed and portion 44 thereof will actuate switch 41 to energize the vibrator. The vibrator is a commercially available item and has an electrical cord 45 with a male plug thereon (not shown) adapted to be inserted into the conventional female electrical outlet. A portion of loop 42 is secured to vibrator 40 by a plurality of pins 49.

The vibration imparted to condiment dispenser 34 will also be imparted to dispenser 10 which will aid in the dispensing of a condiment from dispenser 10 into container 34.

As shown in FIG. 4, member 11 has overlapping ribs thereon along the exterior wall thereof extending longitudinally along container 11 to provide a series of flats 46 adjacent either end of container. These flats 46 will restrain the device from rolling on a counter or other surface which may not be completely level. The flats may be defined on container 11 in any suitable manner.

FIG. 5 is an elevation view showing an optional stand 47 that may be utilized to support dispenser 10 in a vertical position. As shown the stand 47 is flared towards the base 48 thereof to provide greater stability.

Figure 6:
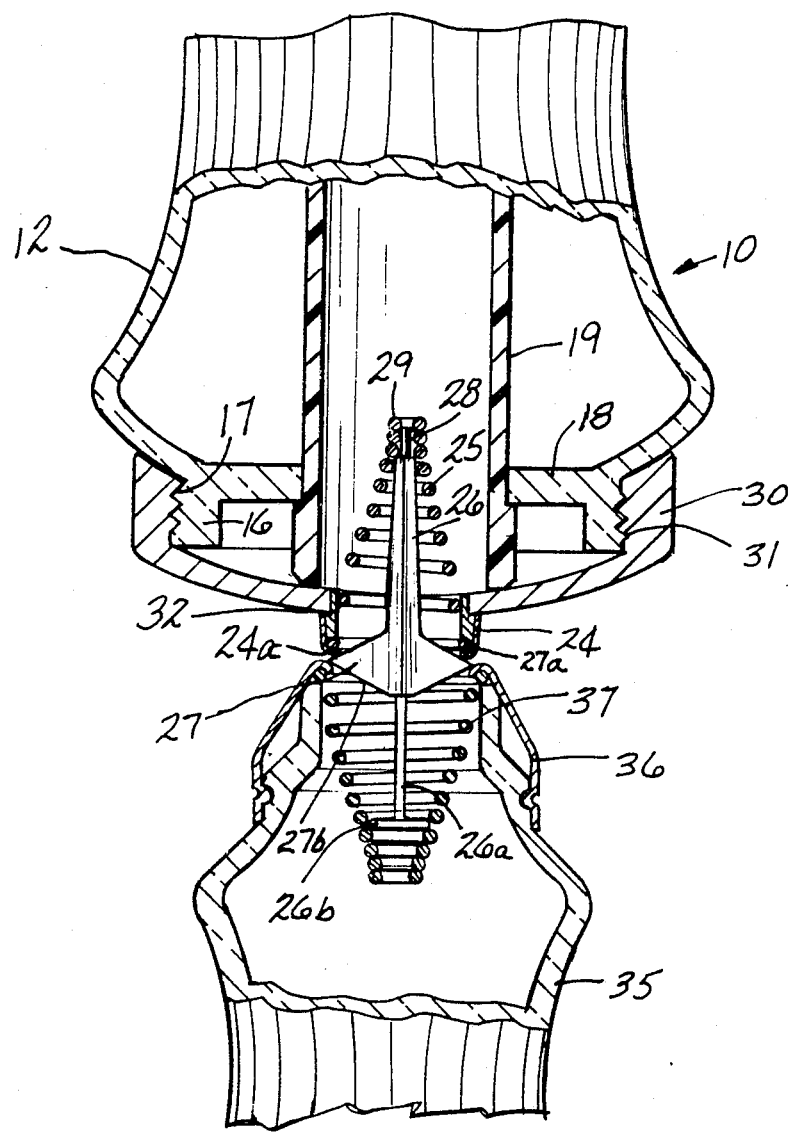
FIG. 6 is an enlarged view of a portion of FIG. 4.

Reference is now made to FIG. 6 which is an enlarged view of a portion of FIG. 4 and more clearly exemplifies the operational relationship of the parts. As shown, ribs 27 are in contact with cap 24 along edges 27a thereof and limit the extension of spring 25. Ribs 27 are also with cap 36 along edges 27b thereof.

In utilizing a dispenser 10, one end with a plunger 26 extending is inserted within spring 37 with downward pressure until cap 24 is in engagement with rib edges 27a, and rib edges 27b engage cap 36. At this time, spring 25 is extended, as is spring 37, and the condiment will flow by gravity from chamber 19 to condiment dispenser 35 through the spaces between the helices of both springs.

It will be noted that the orifice defined by cap 36 is larger in diameter than the orifice defined by cap 24. This guards against spillage of the condiment from chamber 19 when it is utilized to fill a smaller container 35.

A dispenser embodying the invention is quite versatile. It can be used as a condiment dispenser in the preparation of meals, it can be used to fill smaller dispensers, it may be stored in an upright position, or laid down on a counter top for easy access without the probability of rolling.

It may thus be seen that the objects of the invention set forth as well as those made apparent from the foregoing description, are efficiently attained. While a preferred embodiment of the invention has been set forth for purposes of disclosure, modifications to the disclosed embodiment of the invention, as well as other embodiments thereof, may occur to those skilled in the art. Accordingly, the appended claims are intended to cover all embodiments of the invention and modifications to the disclosed embodiment which do not depart from the spirit and scope of the invention.

Having thus described the invention, what is claimed is:

1. A condiment container and dispenser comprising a container having means therein defining a central chamber with an opening at one end of said container and a second chamber about said defining means with an opening at the other end of said container a closure member closing each of said open ends, said closure members having openings therethrough, a spring member of conical shape defined by closely spaced helices of decreasing diameter normally closing each of said openings, a plunger member carried by each of said springs and extending from said closure members, said plunger members being effective to extend an associated spring and permit material to be dispensed from either end of the container and dispenser by shaking or pouring.

2. The dispenser of claim 1 where said plunger members have means thereon for limiting the extension of said springs.

3. The dispenser of claim 1 where an annular adapter member is received in said openings in said closure members and provides a shoulder above said closure members, said springs having a top helix resting on said shoulders, and a cap member defining an opening therethrough is fitted over said adapters and said top helices of said springs.

4. The dispenser of claim 3 where said plunger members have means thereon for limiting the extension of said springs.

5. The dispenser of claim 4 where said means for limiting extension are fins on said plunger member spanning a dimension greater than the diameter of the openings in such closure members.

6. Apparatus for dispensing material in granular or powder form comprising a container having a closure member with an opening therethrough, an annular adapter member secured in said opening, said adapter member defining an opening therethrough, said adaptor member having an annular shoulder about said opening, a conically formed helical spring having a top helix resting and supported on said shoulder of said adapter member, and a cap member defining an opening therethrough friction fitted over said adapter member, said shoulder and said cap member capturing said top helix therebetween.

7. The apparatus of claim 6 further comprising a plunger member carried by said spring and engaging the smaller helices thereof, said plunger member being effective to extend said spring and permit dispensing of material between the helices thereof.

8. The dispenser of claim 7 where said plunger member has means thereon for limiting the extension of said springs.

9. The dispenser of claim 8 where said means for limiting extension are fins on said plunger member spanning a dimension greater than the diameter of the openings in such closure members.

10. Apparatus for filling a dispensing container with material in granular or powder form where said container has an outlet opening defined at the upper end thereof and a spring member of conical shape defined by helices of decreasing diameter about a longitudinal axis, the helices being spaced apart to permit dispensing of material therethrough the spring member being affixed to said container at said outlet opening, said apparatus comprising a second container having means therein defining a central chamber and a second chamber about said defining means, said second container having open ends at opposite ends thereof with each chamber communicating with one of said open ends, a closure member closing each of said open ends, said closure members having openings therethrough, a spring member of conical shape defined by closely spaced helices of decreasing diameter normally closing each of said openings, a plunger member carried by each of said springs and extending from said closure members, said plungers adapted to engage the helical spring of the dispensing container increasing the spacing between the helices thereof and simultaneously extend the helical spring in said apparatus whereby communication is provided between a chamber and the interior of the dispensing container to allow flow of material from one of said chambers to the dispensing container.

11. The apparatus of claim 10, where the defined dispensing container has a socket defined in the bottom thereof adapted to receive a vibrating element, and a vibrator having a vibrating element thereon in said socket.

12. The apparatus of claim 11 where said vibrator has a resilient spring-like member for supporting said apparatus, said spring upon compression being effective to close a switch to energize said vibrator.

13. The apparatus of claim 10 where said plunger members have means thereon for limiting the extension of said springs of said apparatus.

14. The apparatus of claim 13 where said plunger members also have means thereon for limiting the extension of springs in said dispensing container.

15. Apparatus for dispensing material in granular or powder form comprising a container having a closure member with a cap member thereon, both defining an opening therethrough, an annular adapter member secured in said closure member opening, said adapter member defining an opening therethrough, said adaptor member having an annular shoulder about said opening therein, a conically formed helical spring having a top helix resting and supported on said shoulder of said adapter member, said cap member friction fitted over said adapter member, said shoulder and said cap member capturing said top helix therebetween, said openings in said closure member, said cap member and said adapter member being aligned.

16. The apparatus of claim 15 further comprising a plunger member carried by said spring and engaging the smaller helices thereof, said plunger member being effective to extend said spring and permit dispensing of material between the helices thereof.

17. The dispenser of claim 16 where said plunger member has means thereon for limiting the extension of said springs.

18. The dispenser of claim 17 where said means for limiting extension are fins on said plunger member spanning a dimension greater than the diameter of the openings in such closure.

* * * * *